(12) United States Patent
Vu

(10) Patent No.: US 7,500,749 B2
(45) Date of Patent: *Mar. 10, 2009

(54) PROCESS TO MOLD A PLASTIC OPTICAL ARTICLE WITH INTEGRATED HARD COATING

(75) Inventor: Hannah Vu, New Brighton, MN (US)

(73) Assignee: Insight Equity, A.P. X, LP, Ramsey, MN (US)

( * ) Notice: Subject to any disclaimer, the term of this patent is extended or adjusted under 35 U.S.C. 154(b) by 164 days.

This patent is subject to a terminal disclaimer.

(21) Appl. No.: 11/370,731

(22) Filed: Mar. 7, 2006

(65) Prior Publication Data

US 2006/0146278 A1 Jul. 6, 2006

Related U.S. Application Data

(63) Continuation of application No. 10/636,383, filed on Aug. 7, 2003, now Pat. No. 7,025,458.

(60) Provisional application No. 60/401,911, filed on Aug. 7, 2002.

(51) Int. Cl.
*G02C 7/02* (2006.01)

(52) U.S. Cl. .................... 351/177; 351/163; 351/159

(58) Field of Classification Search .................. 351/177
See application file for complete search history.

(56) References Cited

U.S. PATENT DOCUMENTS

| | | | |
|---|---|---|---|
| 5,015,523 A | | 5/1991 | Kawashima et al. |
| 5,049,321 A | * | 9/1991 | Galic .................. 264/1.38 |
| 6,585,373 B2 | | 7/2003 | Evans et al. |
| 6,613,433 B2 | | 9/2003 | Yamamoto et al. |
| 6,770,324 B2 | | 8/2004 | Hooker |
| 7,025,457 B2 | | 4/2006 | Trinh |
| 7,025,458 B2 | * | 4/2006 | Vu ........................ 351/177 |

* cited by examiner

*Primary Examiner*—Jessica T Stultz
(74) *Attorney, Agent, or Firm*—Inskeep IP Group, Inc.

(57) ABSTRACT

Disclosed is a process for molding plastic optical articles with a hard coated film, comprising steps of coating one side of an optical film with a hard coating, pre-curing the hard coating to a tack free state while still maintaining the coating flexibility, making an insert from the coated film for the desired optical article, molding the plastic resin onto the insert through insert injection molding, and post-curing the molded article. The utilization of the pre-curing and post-curing steps have been found to eliminate hard coating cracks during the insert making and the molding step, while providing a hard coating with desired properties. Such an optical article possesses a hard coating integrated on its surface, thus, eliminating the need to further coat the optical article.

17 Claims, 1 Drawing Sheet

PROCESS TO MOLD A PLASTIC OPTICAL ARTICLE WITH INTEGRATED HARD COATING

CROSS-REFERENCE TO RELATED APPLICATIONS

The present invention is a continuation of U.S. patent application Ser. No. 10/636,383 filed Aug. 7, 2003, now U.S. Pat. No. 7,025,458, which claims benefit of U.S. Provisional Application Ser. No. 60/401,911, filed Aug. 7, 2002; both of which are incorporated herein by reference.

BACKGROUND OF THE INVENTION

The present invention relates to a process for molding a plastic optical article having a curved surface with integrated hard coating. The hard coating prevents the optical article from surface scratching and abrasion. The present invention specifically relates to a process to mold a plastic optical lens, and more specifically an ophthalmic lens, with integrated hard coating through insert injection molding. Still more specifically, the present invention relates to a process to mold an ophthalmic lens with a hard coated optical film as the insert.

DESCRIPTION OF RELATED ARTS

Optical articles such as ophthalmic lenses made from non-glass materials, such as polycarbonate and CR-39®, have become popular due to their low cost and light weight. Polycarbonate provides further advantages such as high refractive index and high impact resistance compared to CR-39®. However, polycarbonate is very susceptible to surface scratches and has low resistance to some common chemicals and solvents compared to other materials. Application of a protective hard coating on the surface of a non-glass ophthalmic lens is necessary for its practical use.

As a common practice, plastic optical articles such as ophthalmic lenses are hard coated after they are made, through a process such as dip coating and spin coating. In a dip coating process, an optical article is dipped into a coating bath filled with a coating solution and then lifted at a given speed to yield a given coating thickness. A dip coating process usually comprises the steps of washing the optical article, drying it, dipping and lifting the article into the coating solution to coat it, drying the coating, and finally curing the coating. In a spin coating process, a coating solution is spin applied onto the surface of an optical article. A typical spin coating process is similar to a dip coating process, in that the dipping step replaced by the spin step.

Alternatively, a plastic optical article can be coated through a process known as in-mold coating. This technique is especially useful when the surface to be coated is shaped in a way to make either dip coating or spin coating impossible. An example of such an optical article is a segmented multi-focal lens. U.S. Pat. Nos. 4,338,269, 4,544,572, 4,800,123 and 5,049,321 described in-mold coatings and processes to coat cast ophthalmic lenses. A typical process of in-mold coating comprises steps of applying the coating to the face of a cast mold, drying and/or semi-curing the coating, filling the mold cavity with the optical resin, and fully curing the resin and the coating. While this method is suitable for producing cast plastic or resin optical articles with hard a coated surface, it is not applicable to plastic optical articles, e.g., polycarbonate ophthalmic lenses, produced through an injection molding process. This is primarily due to the difficulty of coating and cleaning the mold surfaces after each molding cycle.

To in-mold coat an injection molded plastic article, the following steps are typically involved: injecting a melt of a thermoplastic resin into a cavity of a mold to form a molded article, generating (through machine control) a thin gap between the article surface to be coated and the corresponding mold surface, injecting a coating composition into the gap, adjusting the gap to commensurate with a predetermined coating thickness, curing the coating composition to form a coated molded article, and withdrawing the coated molded article from the mold. Such processes and coatings have been disclosed in U.S. Pat. Nos. 4,076,788, 4,331,735, 4,366,109, 4,668,460, 5,777,053, and 6,180,043, and Japanese Patent Publications A-5-301251, A-5-318527, and A-8-142119 for example. While methods of in-mold coating for injection molding plastic articles is widely used for large articles such as automobile parts, the technique has limited use in molding plastic optical articles such as ophthalmic lenses. This limitation is primarily due to the complex injection molding process control, difficulty in applying a hard coating thinner than, e.g., 10 µm, extended molding cycles, and a lack of optical quality hard coating.

To enhance the optical quality of hard-coated, injection molded optical articles and to eliminate the post coating process, insert injection molding with a hard-coated film as an insert to mold hard-coated optical articles may be used. Japanese Patent Publications A-60-195515 and A-61-032004 described such a process to make hard-coated goggle lenses and polarized optical parts.

The film is typically hard-coated with a coating based on highly cross-linked acrylates or siloxanes. The coating may either be radiation (e.g., UV) curable or thermally curable. In most cases, coatings based on acrylates are radiation cured and coatings based on siloxanes are thermally cured. Although high degree of cross-linking provides the coating its hardness for abrasion and scratching resistance, it also makes the coating rather brittle with regards to the molding process. When the film is used to mold a hard coated, plastic optical article having some degree of surface curvature, e.g., a polycarbonate ophthalmic lens with a 6 diopter front surface, the coating will crack during the injection molding step because it lacks the requisite elongation characteristics.

In order to avoid cracking of coating during the injection molding process, a thermoformable coating is needed. U.S. Pat. No. 4,477,499 disclose a thermoformable silicone resin coating composition comprising a colloidal silica filled thermoset organopolysiloxane containing a silylated ultraviolet radiation screening compound and a small amount of a Lewis acid compound. U.S. Pat. No. 4,561,950 describes a radiation curable, post-formable coating composition comprising a silicone dicarbinol diurethane diacrylate or dimethacrylate, a polyester diurethane diacrylate or dimethacrylate, and other functional acrylates or acrylic acids. U.S. Pat. No. 4,598,021 disclosed a thermoformable coating composition containing a polycaprolactone polyol and an aminoplast derivative.

U.S. Pat. No. 4,929,506 described a thermoformable polycarbonate sheet or film coated with a hard, abrasion and chemical resistant coating which is the photoreaction product of an acrylated urethane oligomer, a difunctional acrylate monomer and preferably also a monofunctional olefinic monomer.

However, the aforementioned thermoformable coatings gain the formability by loosing certain degree of abrasion and scratching resistance, which is the original purpose of these coatings. They are not hard enough to provide plastic optical articles with the desired abrasion and scratch resistance.

It is now found by the inventor that a molded, hard-coated plastic optical article that has excellent surface optical quality and desired abrasion and scratching resistance can be produced by a process that molds the thermoplastic resin material of the optical article against an optical film having a precured hard coating.

SUMMARY OF THE INVENTION

It is thus an object of the present invention to provide a manufacturing process that, utilizes the insert injection molding method and produces a molded, hard-coated plastic optical article that has excellent surface optical quality and desired abrasion and scratching resistance.

The object is accomplished by using an optical film, coated on one side of a precured or semi-cured coating, as the insert and molding the thermoplastic resin material of the optical article against the un-coated side of the optical film to thermally fuse the thermoplastic resin and the optical film together. The result is a molded, hard-coated optical article.

According the invention, there is a manufacturing process is provided for producing a molded, hard-coated plastic optical article, and comprising:
a) applying a hard coating on one side of an optical film to a desired thickness;
b) precuring the hard coating to a tack free state with predetermined conditions;
c) preparing the insert by punching out and pre-forming the optical film to the designed shape to fit with the desired products;
d) placing the insert in the mold cavity of a molding machine and injection molding the resin material against the insert with predetermined molding conditions;
e) curing the hard coating completely on the molded optical article.

By the term hard coating, it is meant the coating is both abrasion resistant and scratch resistant.

The optical film can either be a single sheet or a composite functional plate, including but not limited to a polarizing laminate plate or a photochromic laminate plate.

The process of the present invention can be used to mold hard-coated optical articles such as ophthalmic lenses and sport goggle plates without the need of a post-coating stage after the articles are molded. Depending on the nature of the optical film, the process can be used to produce pre-coated optical articles with additional functions such as anti-reflection compatible hard coating, polarization, photochromic properties, etc., introduced by the optical film.

DESCRIPTION OF THE INVENTION

Figure 1:
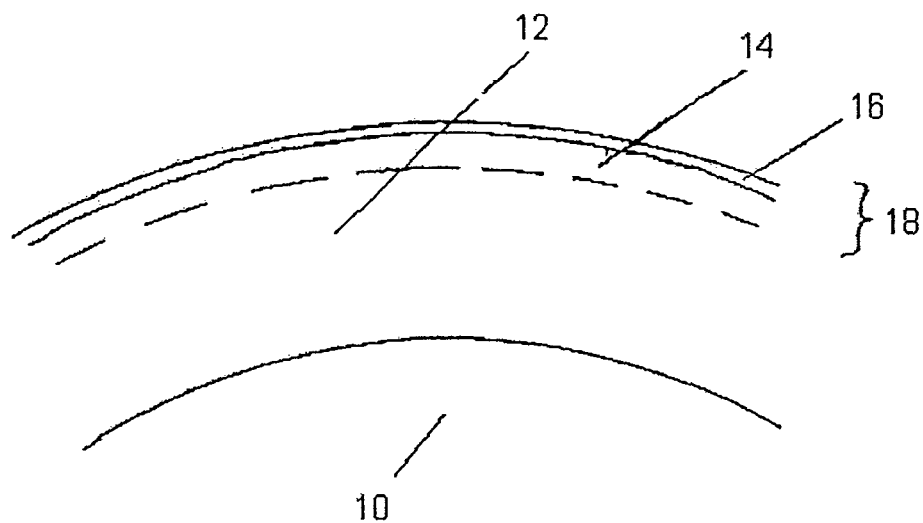
FIG. 1 is a cross-sectional view hard coated lens in accordance with an embodiment of the present invention.

The hard coating applicable in the process of the present invention can be either a thermally or UV curable hard coating, although a thermally curable coating is preferred for its superior abrasion and scratch resistance. UV curable coatings are usually based on the acrylate chemistry, and either are solventless or contain some solvents. They are cured by UV radiation. Thermally curable coatings for ophthalmic lenses are mostly siloxane based, made from hydrolyzed tetraethoxy silane, and other functional silanes. Thermally curable coatings usually have higher abrasion resistance than UV curable coatings. However, thermally curable siloxane coatings need longer curing time than UV curable coatings. For example, thermally curable coatings can be found in numerous patents, such as U.S. Pat. Nos. 4,211,823, 4,547,397, 5,357,024, 5,385,955, and 6,538,092. For example, UV curable coatings U.S. Pat. Nos. 4,384,026, 4,478,876, 4,491,508, 5,126,394, and 5,409,965. These patents are incorporated herein by reference.

A preferred thermally curable hard coating may have a total solid content of between 10% to 50% by weight, and comprise aqueous-organic solvent mixtures containing a mixture of hydrolysis products and partial condensates of an epoxy functional silane and a disilane and an acidic catalyst such as a Brønsted acid, a Lewis acid, or a carboxylic acid. The solvent of the aqueous-organic solvent mixture may be selected from a group consisting of an alcohol, an ether, a glycol, a glycol ether, an ester, a ketone, a glycol ether acetate and mixtures of each. The selected solvent should not dissolve the optical film substrate to be coated. The epoxy functional silane may be selected from a group consisting of 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxyethoxypropylmethyldimethoxysilane, and mixtures of forgoing. Exemplary thermally curable coatings are MP-1154, MD-1183, and MP-1193 from SDC Coatings (Anaheim, Calif.).

An even more preferred hard coating composition comprises components that can be cross-linked by both radiation energy and thermal energy. If this kind of hard coating is used to coat the optical film, radiation energy such as UV can be used to quickly precure the coating to a tack free state, and the final cure will be accomplished by thermal energy. U.S. Pat. No. 6,514,574 discloses such a coating composition, which comprises epoxy silanes, silicate, silica, thermal catalyst, and effective amount of cationic photoinitiator. It is incorporated herein by reference.

In the case where it is difficult to obtain adequate coating adhesion, a primer layer may be applied onto the surface of the optical film before the application of the hard coating composition. The primer layer enhances the adhesion between the film substrate and the coating layer. A polyurethane or acrylic type of primer is preferred. U.S. Pat. No. 5,310,577 discloses a primer consisting of a thermosetting polyurethane in at least one organic solvent, with the polyurethane being formed from a blocked isocyanate, which requires the application of heat to disassociate the blocking agent from the polyurethane so that the isocyanate group can then react with the active hydrogen of the polyol to further polymerize and crosslink the primer coating. Another polyurethane primer is described in U.S. Pat. No. 5,316,791, in which the primer consists of an aqueous polyurethane dispersion and is dried in air at ambient or elevated temperatures. The disclosures of the above U.S. Patents are incorporated by reference herein.

The optical film can be made from any transparent thermoplastic resin material. It is preferably selected from a group consisting of aromatic polyesters (homopolymer, copolymer, or blending), polycarbonates, cyclo-olefin homopolymers and copolymers, polyacrylates, polysulfones, polyarylates, copolymers of styrene and acrylic esters, or blends of thermoplastic resins such as polyester and polycarbonate. It is more preferable that the resin material of the optical film is thermally fusible with the resin material of the optical article so that the film becomes a portion of the optical article without any boundary line. Thus, if the optical article is a polycarbonate ophthalmic lens, the optical film is preferably a polycarbonate film.

If the optical film is a composite functional plate, such as a polarizing laminate plate or a photochromic laminate plate consisting of multi-layers, it is preferred that at least the resin material of the side that is not going to be coated is thermally fusible with the resin material of the optical article to be molded.

While the thickness of an optical film is not particularly restricted, it is typically 2 mm or less, and preferably 1 mm or less but preferably not less than 0.025 mm.

Depending on the application of the optical article to be molded, a variety of transparent resin materials can be used for molding the article. In case that the optical article is an ophthalmic lens or a sport goggle plate, the resin material may be selected from a group consisting of (meth)acrylic resins, styrene-acrylate copolymers, polycarbonate resins, cyclo-olefin homopolymers and copolymers, polyurethanes, polyarylates, polysulfones, polyamides, polyimides, cellulose acetate butyrate; and acrylonitrile-butadiene-styrene. Preferred materials are bisphenol-A polycarbonates such as Panlite® from Teijin, Lexan® from GE Plastics, and Makrolon® from Bayer Polymers.

According to one embodiment of the present invention, the manufacturing process for producing a molded, hard-coated plastic optical article may include:
a) applying a hard coating on one side of an optical film to a desired thickness;
b) precuring the hard coating to a tack free state;
c) preparing the insert by punching out and pre-forming the optical film to the designed shape to fit with the desired products;
d) placing the insert in the mold cavity of a molding machine, and injection molding the resin material against the insert with predetermined molding conditions;
e) curing the hard coating completely on the molded optical article.

In Step a), a hard coating is applied to one surface of the optical film through one of the conventional methods known in the art. Theses methods include, but are not limited to, contact slot die coat, non-contact slot die coat, spray coat, flow coat, gravure/flxo coat, Meyer rod coat, dip coat, and spin coat. The optical film is usually supplied in rolls. Thus, coating application methods that are suitable for single-side web coating process are preferred due to economic concerns. These methods include slot die coat, spray coat, gravure/flexo coat, and flow coat.

The thickness of the hard coating as applied to the optical film can be selected within a broad range to meet the predetermined purpose or objective. It is typical for the final coating thickness to be from 2 to 10 microns, and preferably to be from 4 to 6 microns. The final coating thickness depends on many parameters. For a given coating solution, the coating thickness varies primarily with the coating application speed and the drying speed of the coated layer.

If a primer layer is needed to enhance the adhesion between the hard coating and the optical film substrate, it can be applied in the same way as the hard coating composition, although the desired primer layer is much thinner than the hard coating layer. The dry film thickness of the primer should be from about 0.1 microns to about 1.0 micron, preferably from about 0.1 to about 0.5 microns, most preferably from 0.1 to 0.25 microns.

In step b), the coated optical film is transferred into the drying/precuring area to dry and precure the coating to a tack free state. The precuring condition obviously will depend on the formulation of the hard coating composition, the coating thickness, the energy source, and the desired degree of precuring. Typically, the temperature of the area may be from 90° F. to 250° F. For a thermally curable coating, it is preferred to dry and precure it at about 140 to 200° F. for about 5 to about 60 minutes. If the hard coating composition allows precuring with UV radiation energy, it usually takes about 10 seconds to about 5 minutes.

At this step, the coating can also be partially cured to achieve some abrasion resistance, yet still maintain the flexibility to go through further processing.

In step c), after the precuring step, the coated optical film is cut into a shape that fits the surface of the optical article, which needs protection from abrasion and scratching. The cut can be made in a number of ways, including by rolling knife cutter, reciprocal stamping cutter, straight-edge cutting knife moved translationally along a cut-line, a rotary or swing die traversed along a line or by laser cutter.

The optical film cuts can be optionally formed into a shape that better fits the surface profile of the optical article. For instance, the cuts are formed into wafers of a given diopter if the optical article is an ophthalmic lens. The forming process may be optionally performed thermally with or without pressure or vacuum. It is convenient to utilize a platen having a forming surface that corresponds at least substantially or precisely to, the predetermined surface profile of the optical article to be molded. The temperature for forming will vary with the material of the transparent resin sheets. In general, the thermoforming temperature is close to but lower than the glass transition temperature of the film resin material. For example, a suitable forming temperature for the polycarbonate optical film will be from about 125° C. to 150° C. Often it will be beneficial to preheat the cut, for example, in the case of polycarbonate film, to a temperature from about 80° C. to 120° C. for 5 to 20 minutes. U.S. Pat. No. 5,434,707 describes a pressure assisted thermoforming process. U.S. Pat. No. 5,997,139 describes a vacuum assisted thermoforming process. Their disclosures are incorporated herein by reference.

Figure 2:
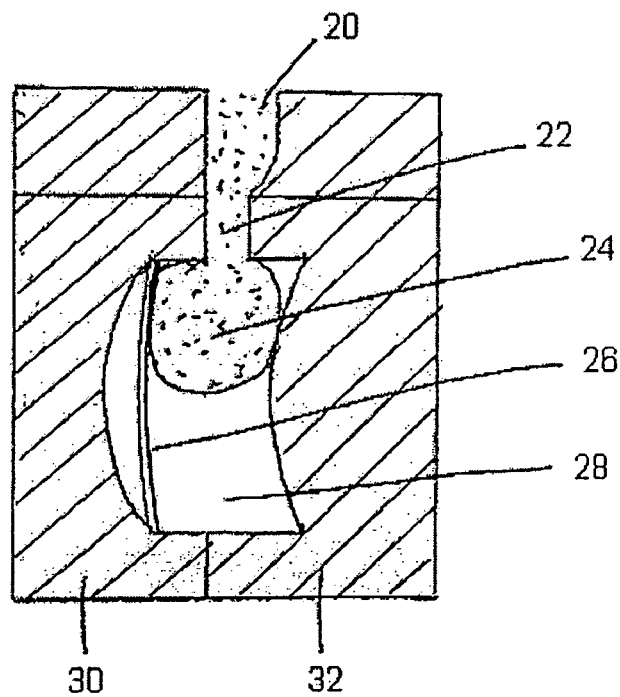
FIG. 2 is a cross-sectional view of a molding process in accordance with an embodiment of the present invention.

According to the present invention, the optical film with precured hard coating on one surface is back-molded with the thermoplastic resin to make the optical article at Step d). Referring to FIGS. 1 and 2, to mold a hard coated optical article 10 with the optical film 18 comprising the film base 14 and the hard coating 16 utilizing an insert injection molding process, the formed optical film 26 is placed in the mold cavity 28 with the coated side facing the interior wall of the mold half 30.

Once the formed optical film 26 has been placed into the mold cavity 28, the two mold halves 30 and 32 close and molten resin material 24 is injected through the runner 20 and gate 22 into the mold cavity 28 to back-mold on the uncoated side of the optical film. The combined action of high temperature from the molten resin and high pressure from the injection screw conforms the optical film cut 26 to the surface of the interior wall of the mold half, and fuses the optical film and the injected resin material together. After the resin melt is hardened, the desired optical article is obtained having an integrated uncured hard coating.

According to the last step of the process of the present invention, the optical article with a pre-cured hard coating layer is exposed to a proper energy source to fully cure the hard coating. For a thermally curable hard coating, the article is transferred into a convection oven. The cure of the coating is completed by heat curing at temperatures in the range of 150° F. to 400° F. for a period of from about 5 minutes to 18 hours. The dew point obviously plays an important role for curing a siloxane based coating. Preferably, the dew point is between 40° F. to 90° F., more preferably between 50° F. to 80° F.

An added advantage of using a thermally cured hard coating is realized at the final curing step. For most thermoplastic resin material, especially those having strong birefringence, injection molding will introduce significant amount of internal stress in the molded products. The temperature and duration of the final curing step thermally annealed the product to reduce the un-desirable internal stress and birefringence.

For optical articles, such as ophthalmic lenses, made from a thermoplastic resin such as polycarbonate, it is preferred to cure the hard coating at a temperature lower than the glass transition temperature of the resin. For polycarbonate lenses, the proper curing temperature is between about 200° F. and 300° F.

Plastic optical articles are thus made with a hard coating integrated thereon. The post coating process is thereby eliminated.

EXAMPLES

The process of the present invention will now be illustrated in more detail by way of an example, which are for illustration purpose only and should not be construed as a limitation upon the scope of the invention in any way.

The abrasion resistance is expressed as the Bayer ratio, which shows the relative abrasion resistance of the test specimen as compared with a standard lens, which is commonly manufactured and used as a benchmark in the ophthalmic lens industry. Higher Bayer ratios indicate greater degrees of abrasion resistance. The Bayer ratio is determined by making percent haze measurements of a test specimen that is to be measured and an uncoated standard reference lens. The haze measurements of each are made both before and after the lenses are concurrently abraded in an oscillating sand abrader as in ASTM test method F 735-81. Uncoated CR-39® (poly[di(ethylene glycol) bis(allyl carbonate)]) lenses are used as the uncoated standard reference lenses. The abrader is oscillated for 300 cycles with 500 grams of aluminum zirconium oxide, ZF 152412 as supplied by Saint Gobain Industrial Ceramics, New Bond Street, PO Box 15137, Worcester, Mass. 01615. The haze is measured using a haze-guard plus haze meter from BYK Gardner. The Bayer ratio is expressed as:

Bayer ratio=final percent haze of standard−initial percent haze of standard final percent haze of specimen−initial percent haze of specimen Example 1

A 0.3 mm thick polycarbonate film (Iupilon™, manufactured by Mitsubishi Gas Chemical Co., Inc.) was punched into discs of 72 mm. One side of the discs was applied with three thermally-cure polysiloxane coatings (Table 1). The coating solutions have a solid level of 18% to 20% and viscosity from 3.5 to 4.5 cPs. Coating solution was used at 50° F. The solution was spin applied at the speed of 500 rpm to a resulting thickness of 3 to 3.5 microns.

After precuring the coating at 180° F. for 15 minutes, the discs were placed in the mold cavities of an injection molding machine with the coated side facing the mold wall maintained at 285° F. Polycarbonate melt at 600° F. was then injected into the cavity, against the uncoated side of the film. The polycarbonate resin was then cooled down under the hold and pack pressure of 1000 psi to form semi-finished single-vision lenses with a 6-diopter base curve. The molded lenses were then put in an oven at 265° F. for 3 hours to cure the hard coating completely. Visual inspection and Bayer testing were performed on these lenses.

No sign of cracking or crazing was observed in this batch of lenses. Bayer ratios for the lenses applied by different coating solutions are listed in table 1.

TABLE 1

| Coating solutions | Bayer ratio After Post-cure |
|---|---|
| Tetraethoxy silane: 3-glycidoxypropyltrimethoxysilane = 1.5:1 | 2.3 |
| amino propyl triethoxy silane: 3-glycido propyl trimethoxy silane = 0.6:1 | 1.8 |
| amino propyl triethoxy silane: 3-glycido propyl trimethoxy silane = 1.2:1 | 2.2 |

The invention claimed is:

1. A method of substantially preventing the formation of cracks on a hardcoat-integrated optical article comprising:
    applying on a siloxane-based hardcoat to an optical film;
    precuring said hardcoated optical film;
    placing said film into a mold cavity;
    introducing a resin material into said mold cavity to form a hardcoat-integrated optical article; and
    curing said optical article.

2. The method according to claim 1, wherein precuring said hardcoated optical film comprises thermally precuring said hardcoated optical film.

3. The method according to claim 1, wherein precuring said hardcoated optical film comprises precuring an optical film that is hardcoated on one surface.

4. The method according to claim 1, wherein placing said film into a mold cavity comprises placing said film into a mold cavity with a hardcoated surface of said film facing an interior wall of a mold half.

5. The method according to claim 1 wherein the introducing of a resin material into said mold cavity to form a hardcoat-integrated optical article comprises introducing a resin material that fuses with a non-hardcoated surface of said film to form said hardcoat-integrated optical article.

6. A method of making a thermally-fused hardcoat-integrated optical article, comprising:
    applying a siloxane-based hardcoat to a thermally-fusible optical film;
    at least partially curing said film;
    inserting said partially cured film into a mold cavity;
    injecting said mold with a thermoplastic resin;
    thermally fusing said thermoplastic resin to said film to form an optical article; and,
    substantially fully curing said optical article.

7. A method of making a thermally-fused hardcoat-integrated optical article, comprising:
    applying a siloxane-based hardcoat to a thermally-fusible optical film;
    at least partially curing said film;
    inserting said partially cured film into a mold cavity;
    injecting said mold with a thermoplastic resin; and,
    thermally fusing said thermoplastic resin to said film to form an optical article;
    wherein applying a hardcoat to a thermally-fusible optical film comprises applying a siloxane-based hardcoat that is cross-linkable by both radiation energy and thermal energy.

8. A method of making a thermally-fused hardcoat-integrated optical article, comprising:
- applying a siloxane-based hardcoat to a thermally-fusible optical film;
- at least partially curing said film;
- inserting said partially cured film into a mold cavity;
- injecting said mold with a thermoplastic resin; and,
- thermally fusing said thermoplastic resin to said film to form an optical article;
- wherein applying said siloxane-based hardcoat to a thermally-fusible optical film comprises applying said siloxane-based hardcoat to a polarizing plate.

9. A method of making a thermally-fused hardcoat-integrated optical article, comprising:
- applying a siloxane-based hardcoat to a thermally-fusible optical film;
- at least partially curing said film;
- inserting said partially cured film into a mold cavity;
- injecting said mold with a thermoplastic resin; and,
- thermally fusing said thermoplastic resin to said film to form an optical article;
- wherein applying said siloxane-based hardcoat to a thermally-fusible optical film comprises applying said siloxane-based hardcoat to a photochromic plate.

10. A method of making a thermally-fused hardcoat-integrated optical article, comprising:
- applying a hardcoat to a thermally-fusible optical film;
- at least partially curing said film;
- inserting said partially cured film into a mold cavity;
- injecting said mold with a thermoplastic resin; and,
- thermally fusing said thermoplastic resin to said film to form an optical article;
- wherein applying a hardcoat to a thermally-fusible optical film comprises applying a siloxane-based hardcoat to a thermally-fusible optical article.

11. The method of claim 10, wherein applying a siloxane-based hardcoat to a thermally-fusible optical article comprises spin applying a siloxane-based hardcoat to a thermally-fusible optical article.

12. A method of making a thermally-fused hardcoat-integrated optical article, comprising:
- applying a hardcoat to a thermally-fusible optical film;
- at least partially curing said film;
- inserting said partially cured film into a mold cavity;
- injecting said mold with a thermoplastic resin; and,
- thermally fusing said thermoplastic resin to said film to form an optical article;
- wherein at least partially curing said film comprises curing said film at 180 degrees F. for 15 minutes.

13. A method of making a thermally-fused hardcoat-integrated optical article, comprising:
- applying a siloxane-based hardcoat to a thermally-fusible optical film;
- at least partially curing said film;
- inserting said partially cured film into a mold cavity;
- injecting said mold with a thermoplastic resin; and,
- thermally fusing said thermoplastic resin to said film to form an optical article;
- wherein thermally fusing said thermoplastic resin to said film to form a thermally-fused hardcoat-integrated optical article comprises thermally fusing a thermoplastic resin material selected from a group consisting of polyester, polycarbonate and mixtures thereof.

14. The method of claim 13, wherein thermally fusing a polycarbonate resin to said film comprises heating a polycarbonate resin to 600 degrees F. and exposing said resin to said film.

15. The method of claim 6, wherein substantially fully curing an optical article comprises curing said optical article at 265 degrees F. for 3 hours.

16. An optical film for use in an injection molded ophthalmic lens process, comprising:
- an optical film;
- a pre-cured siloxane-based hardcoat disposed on one surface of said film;
- an opposing surface of said one surface being free of said siloxane-based hardcoat and comprised of a material suitable for thermal fusing with a molten substance of an injection molded ophthalmic lens;
- wherein said pre-cured siloxane-based hardcoat has a thickness of between 3 and 6 microns.

17. An optical film for use in an injection molded ophthalmic lens process, comprising:
- an optical film;
- a pre-cured siloxane-based hardcoat disposed on one surface of said film;
- an opposing surface of said one surface being free of said siloxane-based hardcoat and comprised of a material suitable for thermal fusing with a molten substance of an injection molded ophthalmic lens;
- wherein said siloxane-based hardcoat comprises components that can be cross-linked by both radiation energy and thermal energy.

* * * * *